United States Patent Office 2,850,555
Patented Sept. 2, 1958

2,850,555

POSITIVE ELECTRODES FOR ELECTRIC BATTERIES AND METHOD OF MAKING SAME

Leo E. Pucher and William A. Cunningham, South Euclid, and Joseph F. Szabo, Lakewood, Ohio, assignors to The Electric Storage Battery Company, a corporation of New Jersey No Drawing. Application November 6, 1953
Serial No. 390,708

3 Claims. (Cl. 136—20)

The present invention relates to batteries and, more particularly, to batteries in which the active material of the positive electrode or plate is or comprises silver oxide, peroxide and/or other so-called higher oxides of silver.

The principal objects of the invention are the provision of a novel and improved battery positive electrode or plate and method of manufacturing the same, in which electrode or plate the active material is or comprises silver oxide, peroxide and/or other higher oxides of silver, and which plate when incorporated with other like electrodes or plates and suitable zinc negative electrodes or plates will produce a battery having high capacity per unit volume, a high discharge rate, will be capable of reaching full discharge voltage very quickly as compared to prior batteries, and will have a low, self-discharge rate resulting in long shelf life.

The invention further resides in certain novel features of construction and methods of manufacture and further objects and advantages of the invention will be apparent to those skilled in the art to which it pertains from the following description of the present preferred embodiments of the invention.

The positive electrode or plate of the present invention comprises silver oxide, peroxide and other higher oxides of silver as the active material supported on or carried by a suitable supporting grid, preferably a silver or nickel wire gauze or screen.

The electrodes or plates are preferably made by pasting suitable grids with a paste made by mixing silver oxide powder (reagent grade) with water and a wetting agent; for example, a 0.1% water solution of a salt of a higher alkyl sulphate. The use of a wetting agent reduces the amount of liquid required to make a workable paste, thereby increasing the paste density and giving higher active material weight per unit volume than would otherwise be obtained. After pasting of the grids, the silver oxide is reduced to a metallic silver sponge by sintering the pasted plate in a furnace at about 880° F. or by drying the pasted plates and passing them through a gas flame. Prior to being sintered, the surfaces of the plates are preferably grooved. This helps to relieve stresses set up during drying and sintering and minimizes buckling, cracking, and other physical distortions of the plates during the sintering or reducing operation. The sintering plates are preferably compressed to smooth out any possible bumps or high spots, having in mind the extreme thinness of the separators or insulation with which they are to be subsequently assembled.

The metallic silver sponge material of the electrode or paste may be formed anodically to silver oxide, peroxide and/or other oxides of silver by assembling a plurality of the plates with suitable negative plates, preferably pasted negative plates in which zinc oxide is the active material, into a battery or cell element with adjacent plates separated from one another by suitable insulators or separators. To assure complete formation of the end plates, nickel screen or gauze "dummy" plates may be included in the assembly as end-positive and end-negative plates, respectively. Alternatively the plates may be entirely formed against "dummy" negative plates.

Preparatory to forming, the positive plates are preferably placed in synthetic fiber screen bags. If, during formation, positive active material is allowed to come into direct contact with cellulosic material, such as paper, the silver oxide and peroxide will react with such material and the plates will not form properly. By placing the positive plates in synthetic fiber screen bags, such as are produced from synthetic resins commercially available under the trade names "Saran" (vinylidene chloride), "Nylon" (polyamide), "Teflon" (fluorinated hydrocarbon), direct contact between the plates and the cellulosic insulation is prevented, and satisfactory formation is obtained. The material preferably should be about 30 x 30 mesh.

After assembly of the element, the individual plate lugs consisting of portions of gauze or screen projecting above the pasted part or portion are soldered or otherwise connected together into positive and negative plate groups, respectively. These lugs extend above the element proper and are used as terminals for connecting to a direct current forming source of electricity. The element is next placed in a formation container filled with approximately a 5% potassium hydroxide solution.

The terminals of the element are connected to the direct current forming or charging circuit, and the cell is charged from about 12 to 24 hours at a rate based on the total weight of silver in the element. At the end of this time the circuit is opened and the cell discharged at about 90% of the charging rate for about 1 to 1½ hours. The time of charge and discharge, however, depends upon the thickness and weight of the plates.

On completion of the discharge, the cell is recharged for about 2 to 3 hours at the original charging rate. Voltage readings are taken periodically during charge, discharge, and recharge as a check on cell condition. A short open stand, up to about 10 minutes, is permissible between the charge, discharge and recharge cycles. A longer stand is not advisable because of the possibilities of the cell developing internal short circuits causing self-discharge at uncontrolled rates.

Following the recharge, the cell is washed for about 2 to 5 minutes with cold, running tap water. The plate lugs are cut and the individual plates transferred to a positive plate wash tank. Insulating material and fiber screen bags are removed as the plates are separated from the element. The positive plates are preferably washed about 1 hour in cold, running tap water, blotted on paper towelling and air-dried in a circulating air chamber.

The positive plates are preferably given an additional formation against nickel screen dummies. This extra formation is given in about 10% potassium hydroxide solution and at a temperature of about 110° F. to 120° F. Charging rate and time are based on the weight and thickness of the plates. Following the second formation, the positive plates are washed about ½ hour in cold, running tap water and dried at room temperature in circulating air. It has been found that this additional formation of the positive plates increases the capacity of the battery in which they are employed 30% or more.

Instead of giving the positive plates an extra formation against dummies after the formation against negative plates, it is also possible to preform them against dummies before the formation against negative plates. Alternatively the plates can be formed entirely against dummies, but it has been found that batteries built with positives and negatives which were formed together will give 2 to 3 times the capacity of batteries whose plates were formed separately against dummies. It has also been found that batteries comprising positive plates manufactured in accordance with the present invention do not have the usual high voltage hump upon initial discharge in service characteristic of other so-called "silver-zinc" batteries.

Formation rate and time are based on the total weight and thickness of silver in the element. There is no hard and fast rule as to the formation time as it depends upon plate thickness, type of insulation used between the plates, current density, cell temperature, etc. Actual experience, however, indicates that positive plates with an average thickness of 0.020" require from about 500 to 700 ampere-hours formation per pound of silver. A charging rate of about 0.08 to 0.12 amperes per gram of silver has been used successfully with plates of the character referred to. Thicker plates (for example 0.060" thick) require 700 to 800 ampere-hours per pound of silver for initial formation. The additional formation against dummy cathodes, referred to, is preferably about 150 to 200 ampere-hours per pound of silver. Discharge and subsequent recharge may be omitted when a high, first-cycle capacity battery is not required.

The edges of the plates are preferably pressed heavily just prior to assembly. This flattens any jagged edges, protruding wires, or other irregularities, thereby reducing possibilities of short-circuits in the finished cell. The plates may have a density of from about 30 to 75 grams per cubic inch. The preferred density, however, is from about 40 to 55 grams per cubic inch.

If the plates are over-pasted and, therefore, relatively thick, a special "saturating" paper made by Hollingsworth and Whitney and sold under the trade name "Singer Paper" is preferably used for plate separators.

From the foregoing description, it will be apparent that the objects heretofore enumerated and others have been accomplished.

While the preferred construction of the electrode or plate of the present invention and the preferred method of its manufacture have been described in considerable detail, it will be apparent to those skilled in the art to which the invention relates that changes may be made both in the construction and in the method of manufacture within the scope of the present invention, and it is the intention to cover hereby all adaptations and modifications thereof within the scope of the appended claims.

Having thus described our invention, we claim:

1. The method of forming the electrodes for silver-zinc batteries, said electrodes comprising respectively metallic silver and zinc oxide when in an unformed condition, comprising the steps of electroforming said positive electrodes against said negative electrodes to convert said metallic silver to silver oxide, for a total electrical input of between about 500 ampere hours to about 800 ampere hours per pound of silver, in a solution of about 5% potassium hydroxide, separating said electrodes, inserting said positive electrodes into a container with dummy negative electrodes and a solution of about 10% potassium hydroxide, and subjecting said positive electrodes to additional formation whereby said silver oxide is substantially converted to silver peroxide.

2. The method of claim 1 in which a charging rate of from about 0.08 amperes to about 0.12 amperes per gram of silver is used to convert said silver to silver oxide.

3. The method of claim 1 in which the conversion of the positive electrode from silver oxide to silver peroxide is accomplished by an electrical input of between about 150 ampere hours to about 200 ampere hours per pound of silver.

References Cited in the file of this patent

UNITED STATES PATENTS

| | | |
|---|---|---|
| 732,842 | Gardiner | July 7, 1903 |
| 2,441,896 | Moir | May 18, 1948 |
| 2,513,292 | Denison et al. | July 4, 1950 |
| 2,561,943 | Moulton et al. | July 24, 1951 |
| 2,594,711 | Andre | Apr. 29, 1952 |
| 2,623,915 | Moulton | Dec. 30, 1952 |
| 2,724,734 | Howard | Nov. 22, 1955 |